(12) United States Patent
Lin et al.

(10) Patent No.: US 9,808,933 B2
(45) Date of Patent: Nov. 7, 2017

(54) ROBOTIC SYSTEM WITH RECONFIGURABLE END-EFFECTOR ASSEMBLY

(71) Applicants: GM GLOBAL TECHNOLOGY OPERATIONS LLC, Detroit, MI (US); Delaware Capital Formation, Inc., Wilmington, DE (US)

(72) Inventors: Yhu-Tin Lin, Rochester Hills, MI (US); Joerg Pohlers, Kammerhofweg (DE); Ken Dellach, Shelby Township, MI (US); Maurice Perlman, Oak Park, MI (US)

(73) Assignees: GM Global Technology Operations LLC, Detroit, MI (US); Delaware Capital Formation, Inc., Wilmington, DE (US)

( * ) Notice: Subject to any disclaimer, the term of this patent is extended or adjusted under 35 U.S.C. 154(b) by 45 days.

(21) Appl. No.: 15/080,069

(22) Filed: Mar. 24, 2016

(65) Prior Publication Data

US 2016/0288322 A1 Oct. 6, 2016

Related U.S. Application Data

(60) Provisional application No. 62/142,748, filed on Apr. 3, 2015, provisional application No. 62/142,751, filed on Apr. 3, 2015.

(51) Int. Cl.
G05B 19/18 (2006.01)
B25J 9/16 (2006.01)
(Continued)

(52) U.S. Cl.
CPC .......... *B25J 9/163* (2013.01); *B25J 15/0061* (2013.01); *B25J 15/0616* (2013.01); *Y10S 901/41* (2013.01)

(58) Field of Classification Search
CPC .... B25J 9/163; B25J 15/0061; B25J 15/0616; B25J 15/0408; Y10S 901/41; Y10S 901/30
(Continued)

(56) References Cited

U.S. PATENT DOCUMENTS 5,380,978 A * 1/1995 Pryor .................. B23K 26/032
219/121.64
5,612,905 A * 3/1997 Maillart ............. G01B 11/2518
250/559.22

(Continued)

*Primary Examiner* — Jaime Figueroa
(74) *Attorney, Agent, or Firm* — Quinn IP Law

(57) ABSTRACT

A robotic system includes a robot, an end-effector assembly disposed at a distal end of a main boom, rotatable parallel frame rails, and tool support branches. Tool modules are connected to a tool support branch and rotatable/translatable with respect to a respective branch axis. A configuration tool has a control block engaged by a wrist of the robot and a work tool. A controller commands the robot to automatically configure the end-effector assembly by adjusting the frame rails and/or tool support branches or tool modules using the work tool, doing so in response to an identified work task. Engagement of the wrist with the tool changer is commanded and the identified work task is executed using the end-effector assembly. A configuration stand may automatically flip the end-effector assembly to a configuration location, command engagement of the wrist with the tool changer, and configure the end-effector assembly.

19 Claims, 11 Drawing Sheets

(51) Int. Cl.
*B25J 15/06* (2006.01)
*B25J 15/00* (2006.01)

(58) Field of Classification Search
USPC ..... 700/245, 250; 294/86.4, 119.1; 483/901; 901/30, 41
See application file for complete search history.

(56) References Cited

U.S. PATENT DOCUMENTS

| | | | |
|---|---|---|---|
| 6,244,814 B1* | 6/2001 | Herbermann | B21D 43/055 294/65 |
| 6,409,001 B1 | 6/2002 | Kerr | |
| 8,025,277 B2 | 9/2011 | Lin et al. | |
| 8,496,425 B2* | 7/2013 | Lin | B25J 15/0052 192/223 |
| 8,857,877 B2 | 10/2014 | Lin et al. | |
| 9,120,231 B2 | 9/2015 | Lin et al. | |
| 2003/0177656 A1* | 9/2003 | Sawdon | B25J 9/1692 33/645 |
| 2011/0238207 A1* | 9/2011 | Bastian, II | B65G 61/00 700/217 |
| 2012/0279602 A1* | 11/2012 | Lin | B25J 15/0061 138/109 |
| 2012/0280526 A1* | 11/2012 | Lin | B25J 15/0061 294/183 |
| 2012/0280527 A1* | 11/2012 | Lin | B25J 15/0061 294/213 |
| 2014/0356049 A1* | 12/2014 | Lin | B25J 15/0616 403/59 |
| 2015/0020365 A1 | 1/2015 | Valasek et al. | |

* cited by examiner

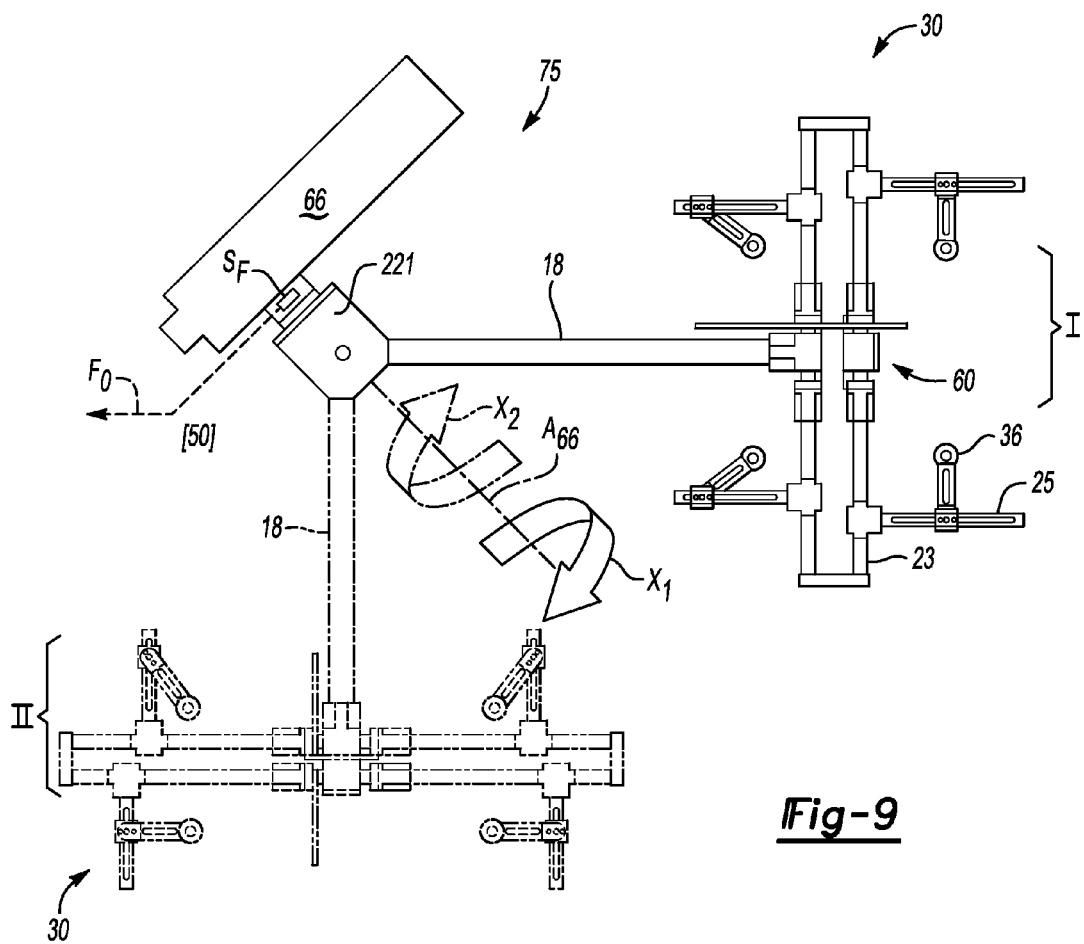

ROBOTIC SYSTEM WITH RECONFIGURABLE END-EFFECTOR ASSEMBLY

CROSS-REFERENCE TO RELATED APPLICATIONS

This application claims the benefit of U.S. Provisional Application No. 62/142,748 and U.S. Provisional Application No. 62/142,751, both of which were filed on Apr. 3, 2015, and both of which are hereby incorporated by reference in their entireties.

TECHNICAL FIELD

The present disclosure relates to a robotic system with a reconfigurable end-effector assembly.

BACKGROUND

Multi-axis industrial robots include articulated arms connected via a shoulder joint. Each segment is driven via one or more joint motors. Typical industrial robots are controlled with respect to six different control axes. Collectively, the control axes enable rotation of the robot with respect to a fixed or mobile base, extension/retraction of a first arm, and raising/lowering of a second arm, as well as shoulder joint rotation and rotation/translation of a wrist disposed at a distal end of the second arm. Additional arms may be used in a serial arrangement depending on the design, and an end-effector connected to the wrist may be manipulated to perform a desired work task.

The term "end-effector" refers to the particular end linkages or segments that, depending on the design of the robot, can securely grip, transport, orient, and release a work piece or a tool. Certain end-effector assemblies are formed via a latticed array of elongated beams and rails to which are attached a set of tool modules, e.g., suction cups or grippers of the type used for moving metal panels or panes of glass in a manufacturing facility. The individual tool modules can be manually adjusted by an operator to a predetermined configuration prior to performing a specified work task. While arrayed end-effector assemblies of this type are useful in manufacturing/material handling environments, current designs may be less than optimal in terms of adjustability and overall space utilization.

SUMMARY

A robotic system is disclosed herein that includes a multi-axis robot, an end-effector assembly, a configuration tool, and a controller. The robot, end-effector assembly, and configuration tool together address some of the aforementioned problems associated with existing end-effector designs. The end-effector assembly disclosed herein can be quickly reconfigured by the robot in response to control signals issued by the controller, and thereafter used for material handling or other purposes when processing different components, for instance contoured body panels or flat panes of glass. In lieu of conventional self-locking clutches or calipers, each tool module is automatically unclamped, moved, and re-clamped with screw clamp mechanisms configured as a set of linear and/or linear/rotary joint locks, which are selectively adjustable via the configuration tool. The present design may provide certain cost and weight advantages relative to existing systems.

In a possible embodiment, the end-effector assembly includes dual parallel frame rails with multiple orthogonally-arranged tool support branches, all of which are automatically repositionable by the robot and disposed on an elongated main boom. A bi-directional clutch assembly has lever arms adapted for articulating the frame rails with respect to an axis of the main boom. The bi-directional clutch assembly may be pneumatically-locked or unlocked in some embodiments, and tubing may be routed around the bi-directional rotary clutch assembly to the individual tool modules to provide the required pneumatic power or vacuum depending on the application.

The configuration tool disclosed herein may include a work tool such as a torque wrench or nut driver, as well as a tool bit and a plurality of locating pins suitable for engaging a mating feature of a joint locking mechanism during a configuration phase of control. In such a control phase, the end-effector assembly may be deposited by the robot onto a configuration stand, whether suspended above or mounted to a floor or machine column, so as to provide a known reference frame for configuration. The master boom includes a double-sided tool changer allowing simultaneous engagement of the master boom with the robot and the configuration stand.

A robotic system is disclosed herein having a multi-axis robot with an arm and a wrist. The system includes an end-effector assembly having a main boom, a tool changer assembly disposed at a distal end of the main boom, parallel frame rails arranged orthogonally with respect to the main boom and rotatable with respect to an axis of the main boom, a plurality of tool support branches arranged orthogonally with respect to the parallel frame rails, and a plurality of tool modules. The tool modules are connected to a respective one of the tool support branches, and are rotatable and translatable with respect to an axis of a respective one of the branches. The system also includes a configuration tool having a control block disposed at one distal end of the configuration tool that is selectively engageable via the wrist, and a work tool disposed at another distal end of the configuration tool.

As part of the system, a controller is programmed to command the robot to automatically configure the end-effector assembly by adjusting at least one of the tool modules, the parallel rails, and the tool support branches using the configuration tool in response to an identified work task, and to thereafter command engagement of the wrist with the tool changer and execute the identified work task using the configured end-effector assembly.

A configuration stand may be included as part of the system. Such a configuration stand provides a known reference frame or calibrated coordinates for configuration of the end-effector assembly. The tool changer assembly includes a first tool changer configured to engage the robot and a second tool changer configured to simultaneously engage the configuration stand.

The above and other features and advantages of the present disclosure are apparent from the following detailed description of some of the best modes, if known, and other embodiments for carrying out the disclosure, as defined in the appended claims when taken in connection with the accompanying drawings.

BRIEF DESCRIPTION OF THE DRAWINGS

FIG. 9 is a schematic plan view of the end-effector assembly and a single-axis configuration stand in both a configuration position and a load position.

DETAILED DESCRIPTION

Figure 1:
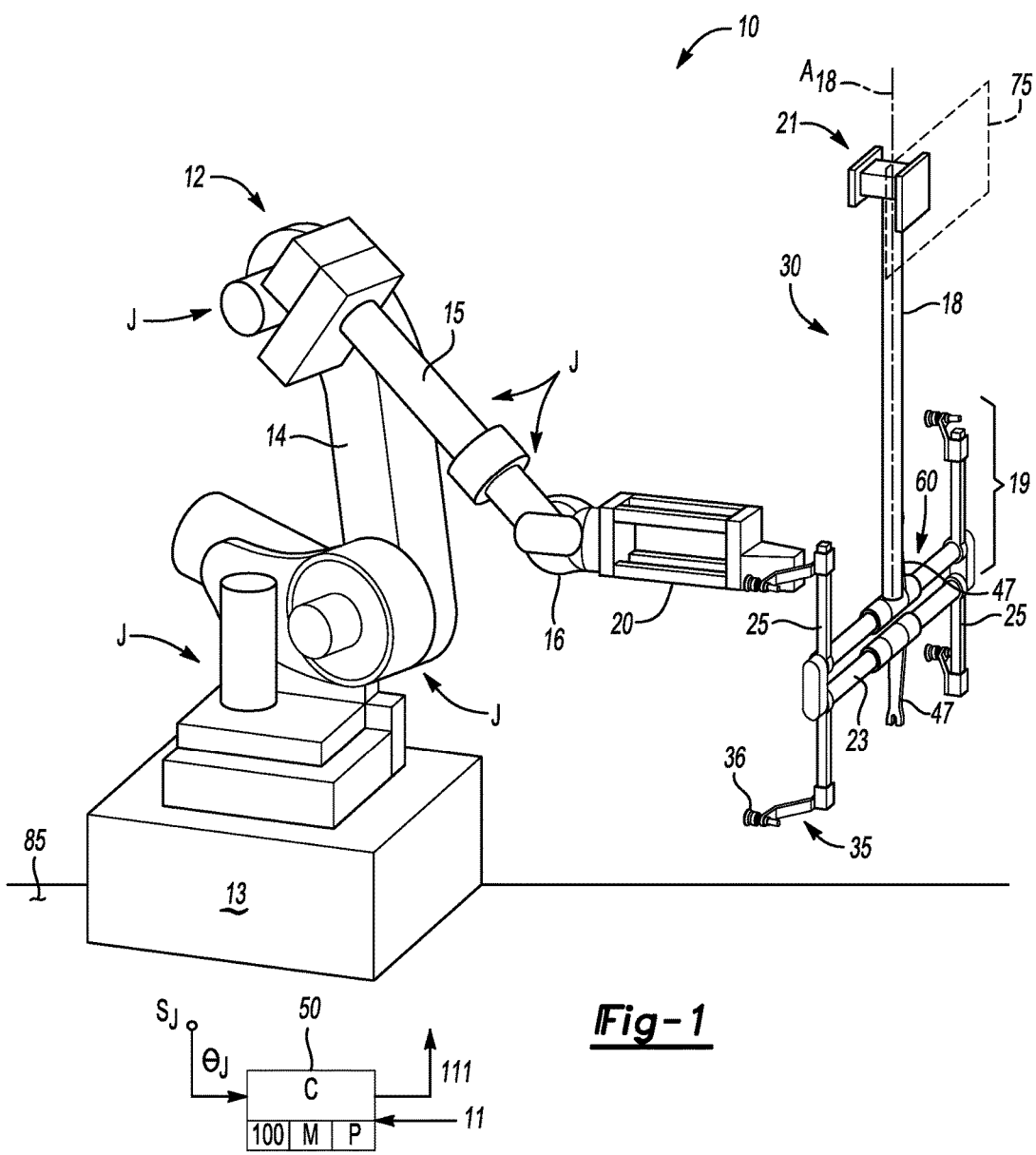
FIG. 1 is a schematic perspective view illustration of an example robotic system as described herein.
Figure 5:
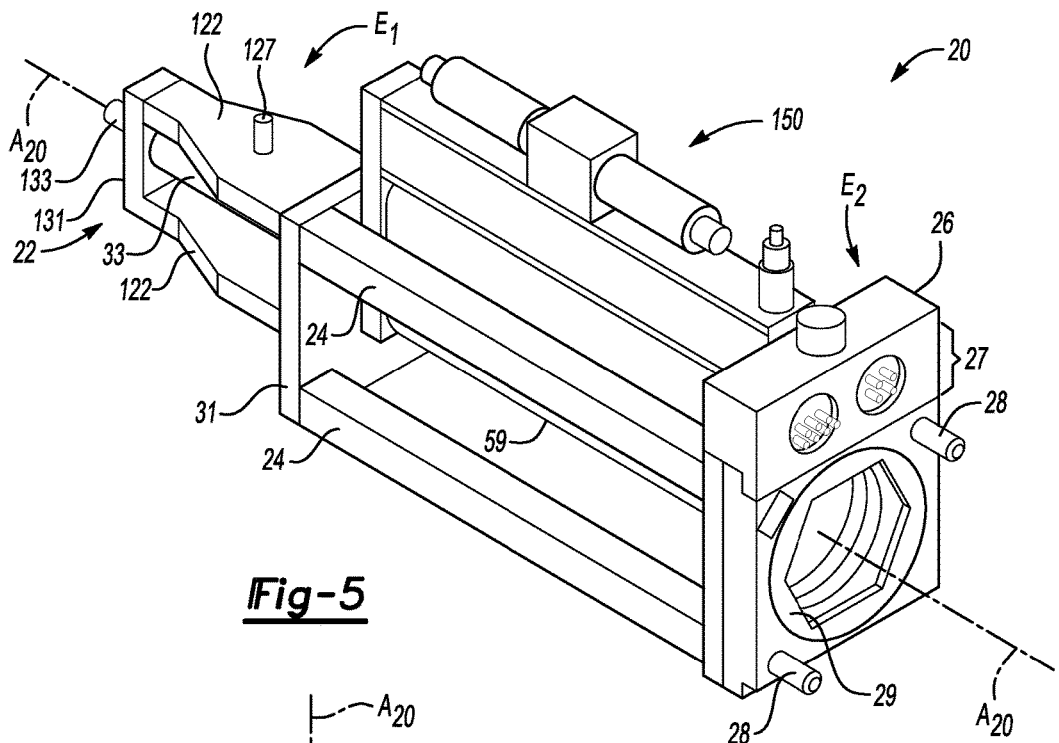
FIG. 5 is a schematic perspective view illustration of an example configuration tool usable as part of the robotic system shown in FIG. 1.
Figure 6:
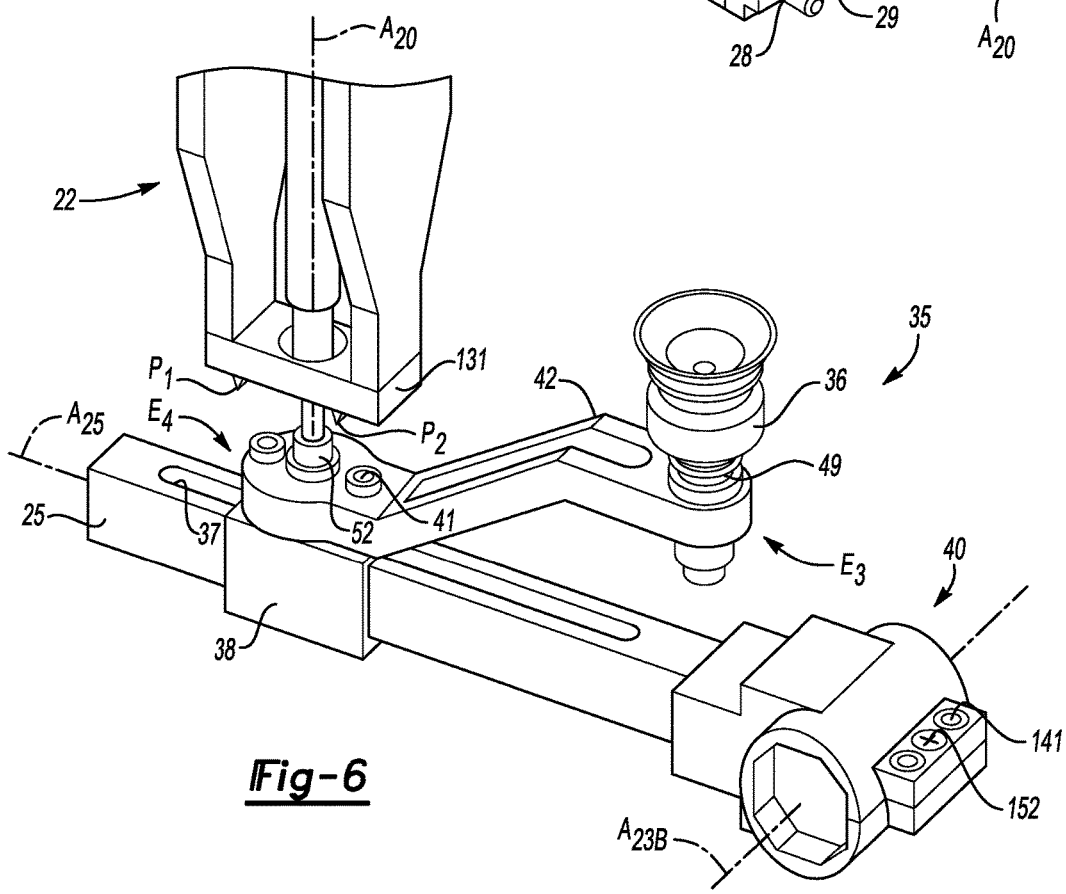
FIG. 6 is a schematic perspective view illustration of a portion of the configuration tool of FIG. 5 while engaged in a configuration phase of control.

Referring to the drawings, wherein like reference numbers refer to like components throughout the several Figures, a robotic system 10 is shown schematically in FIG. 1. The robotic system 10 includes a multi-axis industrial robot 12, a configuration tool 20 as best shown in FIGS. 5 and 6, and a reconfigurable end-effector assembly 30 described in detail below with reference to FIGS. 2A-4 and 7. Overall operational control of the robotic system 10 may be achieved via a controller (C) 50 via execution of a method 100, an example embodiment of which is shown in FIG. 8. The robotic system 10 may include a configuration stand 75, 175 as detailed in FIGS. 9-11E, with a method 200 for using the configuration stand 75, 175 shown in FIG. 12.

The robot 12 of FIG. 1 may be embodied as a conventional 6-axis industrial robot as shown, and therefore may include a fixed or mobile base 13 and a plurality of robotic joints J, at least some of which are shown in FIG. 1. The various joints J connect segments or serial linkages of the robot 12, including a lower arm 14, an upper arm 15, and a wrist 16, and collectively provide the desired range of motion and number of control degrees of freedom needed for performing assigned work tasks.

As explained below with reference to the remaining Figures, examples of such work tasks include the grasping, lifting, locating, and placement of panels of metal or glass panes, along with a host of other possible tasks such as painting and welding. Joint position sensors $S_J$ may be positioned with respect to each joint J and configured to measure and report the measured joint positions (arrow $\theta_J$) to the controller 50. Additionally, one or more force sensors (not shown) may also be positioned with respect to the joints J, e.g., the wrist 16, and used to provide force or torque feedback to the controller 50, which may avoid excessive force on the work piece or the end-effector assembly 30 during execution of the method 100.

With respect to the end-effector assembly 30 in particular, this structure may include a master boom 18 and a latticed end-effector array 19. The end-effector array 19 in the depicted embodiments includes parallel frame rails 23 arranged orthogonally with respect to a longitudinal axis $A_{18}$ of the master boom 18. Tool support branches 25 may be cantilevered with respect to the frame rails 23 as shown, and thus extend radially outward from the frame rails 23. The various tool support branches 25 are slidingly attached to/translatable along a respective one of the frame rails 23. Individual tool modules 35, shown in the various Figures as example vacuum suction cups or grippers, are suspended from the tool support branches 25. Each frame rail 23 is connected in turn to the master boom 18 via a conventional bi-directional clutch assembly 60 of the type known in the art, with an example embodiment of the bi-directional clutch assembly 60 best shown in FIG. 4.

Figure 2A:
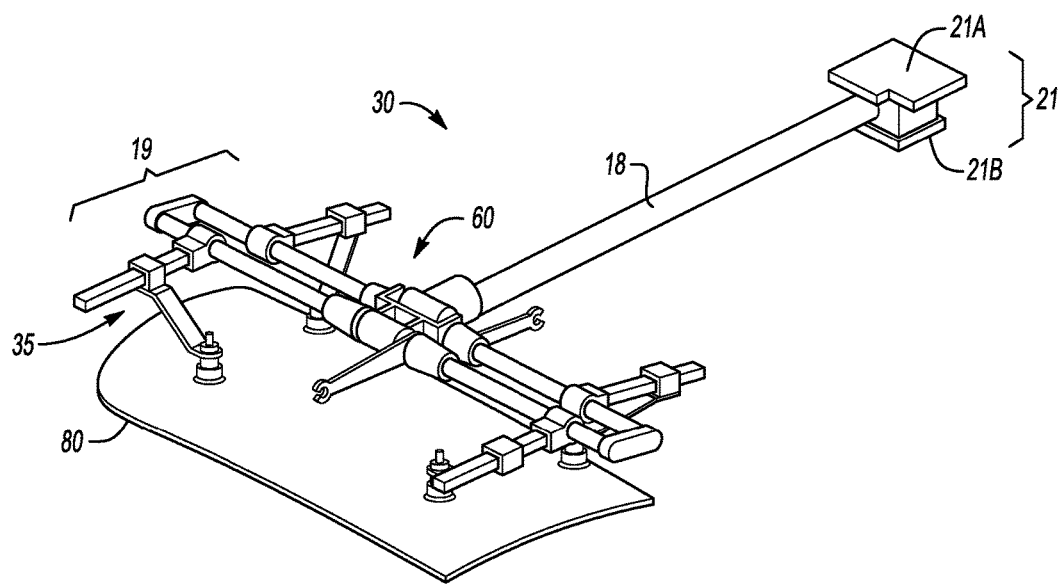
FIGS. 2A and 2B are schematic perspective view illustrations of two possible example configurations of an arrayed end-effector assembly usable with the robotic system shown in FIG. 1.
Figure 2B:
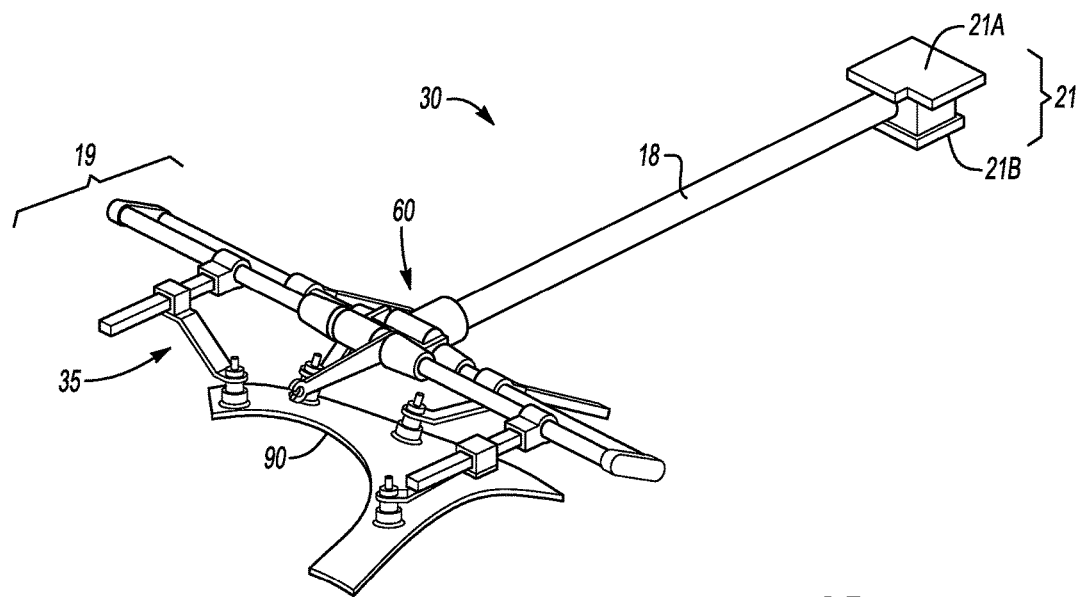
Figure 10A:
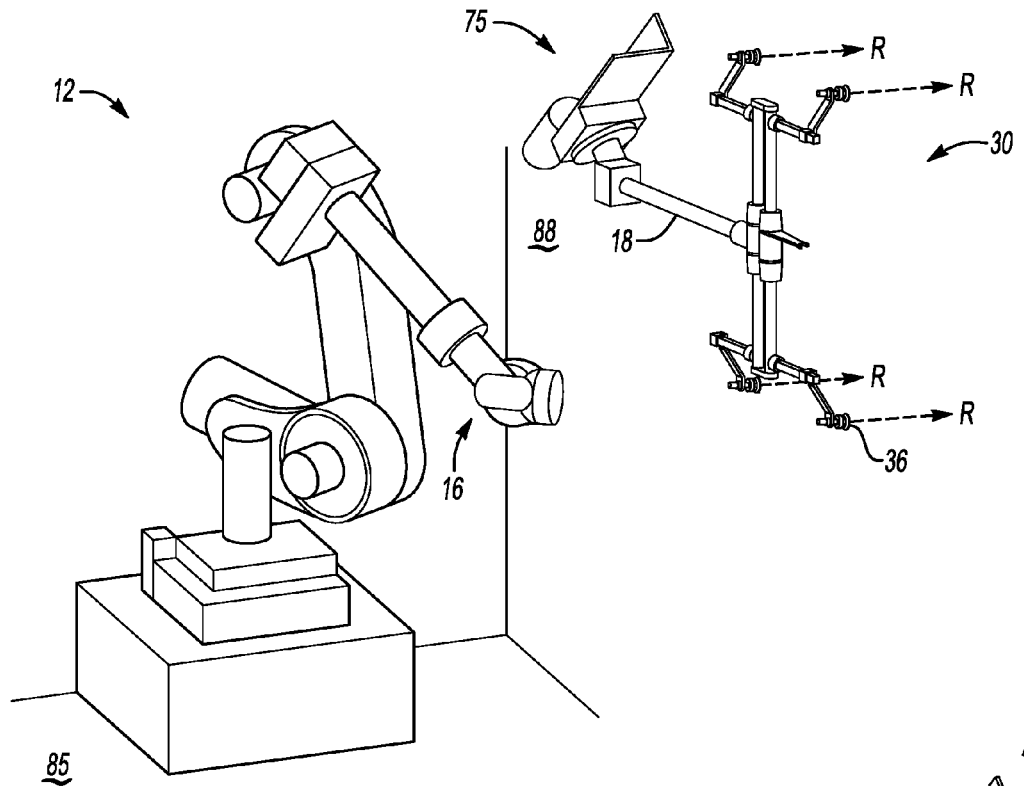
FIGS. 10A-C are perspective view illustrations of the end-effector assembly of FIG. 8 as it is rotated or flipped between a load position and a configuration position.

The master boom 18 includes a double-sided tool changer assembly 21 having separate first and second tool changers 21A and 21B, with the first and second tool changers 21B and 21A shown in FIGS. 2A and 2B. As is well known in the art, the term "tool changer" refers to manual or automatic assemblies that enable rapid change out of robotic end-effectors. Such devices typically include integrated power and communications ports, connectors, and the like as needed for functioning of the end tools 36. Unlike conventional tool changers, however, the tool changer assembly 21 is specially configured to provide simultaneous engagement of the master boom 18 with both the robot 12 and a configuration stand 75, the latter of which is shown schematically in FIG. 1. A more detailed example embodiment of the configuration stand 75 is depicted in FIGS. 9-10C and discussed below with reference to the same Figures. An alternative dual-axis configuration stand 175 is shown in FIGS. 11A-E.

For the purposes of the present disclosure, the configuration stand 75 of FIG. 1 may be fixed with respect to a floor 85 or suspended from a vertical surface such as a machine column or wall. The configuration stand 75 has a predetermined position in a Cartesian (e.g., XYZ) frame of reference, and thus provides a calibrated reference point for zeroing of the robot 12 during reconfiguration of the end-effector assembly 30. For example, when transitioning from a first configuration as shown in FIG. 2A to another configuration as shown in FIG. 2B, the robot 12 connects the first tool changer 21B to the configuration stand 75 and releases the second tool changer 21A. As the robot 12 reconfigures the end-effector assembly 30, the locations in free space of each of the joint locking mechanisms described below is known to the controller 50 by virtue of the known location in the frame of reference provided by the configuration stand 75. In the event the configuration of the end-effector 30 becomes unknown during an operation, e.g., due to an impact event or power failure, the end-effector assembly 30, while suspended from the configuration stand 75, can be manually set to a calibrated setting in which the positions of the various tool modules 36 are known, with configuration thereafter commencing from the zeroed setting.

As described below with particular reference to FIGS. 2A-4, the tool support branches 25 with attached tool modules 35 are automatically repositionable by the robot 12 using the configuration tool 20 according to the method 100 and instructions executed by the controller 50, and thus may be arranged as desired to permit the tool modules 35, or more precisely the individual end tools 36 of the tool modules 35, to attach to or otherwise interact with a given work piece. In a non-limiting body panel example, for instance, the corresponding end tools 36 as shown in the various Figures are configured as pneumatic suction cups or grippers of the type commonly used to secure and move automotive or other body panels without marring cosmetic show surfaces. However, other end tools 36 may be readily envisioned within the intended scope of the present invention, such as pinchers, clamps, spray nozzles, etc., and therefore the particular construction of the end tools 36 may vary.

Overall control of the robotic system 10 is provided by the controller 50. The controller 50 may be configured as a host machine, e.g., a digital computer, that is specially programmed to execute steps of the method 100. To that end, the controller 50 includes sufficient hardware to perform the required method steps, i.e., with sufficient memory (M), a processor (P), and other associated hardware such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like.

As part of the method 100, the controller 50 receives and records the measured joint positions (arrow $\theta_J$) from the position sensors ($S_J$), and also monitors forces applied by or to the end-effector assembly 30 in the course of configuring the end-effector assembly 30 as well as while operating on a given work piece. The controller 50 generates or receives input signals (arrow 11) informing the controller 50 as to the required work tasks to perform and identifying the corresponding work pieces, and outputs control signals (arrow 111) to the robot 12 to command the required actions from the robot 12.

Two non-limiting example work pieces 80 and 90 are depicted schematically in FIGS. 2A and 2B, respectively. The work pieces 80 and 90 may have different sizes, shapes, and/or surface contours relative to each other and other work pieces (not shown), or they may be constructed of different materials. Thus, the design of the work piece 80 in FIG. 2A is shown considerably larger and more uniform than that of the work piece 90 of FIG. 2B, thereby requiring different configurations of the same tool modules 35. Any number of possible work pieces may be encountered in a given manufacturing operation, and thus the end-effector assembly 30 is reconfigurable by the robot 12 of FIG. 1 to operate on any of them individually as needed.

That is, the controller 50 of FIG. 1 is made aware of the particular work piece to be operated on via the input signals (arrow 11 of FIG. 1), such as via manual selection by an operator, detection of an RFID tag, or any other suitable identifying process. The controller 50 then automatically selects a corresponding configuration from its memory (M). After the end-effector assembly 30 has been hung on the configuration stand 75 and rotated to a configuration position, the robot 12 attaches the configuration tool 20 of FIG. 5 at a suitable work station (not shown) to its wrist 16 or other suitable end linkage and configures the end-effector assembly 30. While omitted from the Figures for illustrative simplicity, such a work station may be embodied as a fixture which allows the configuration tool 20 to be retained at a calibrated position, i.e., a position readily accessible by the wrist 16. All of this occurs while the end-effector assembly 30 remains captive on the configuration stand 75.

Once the end-effector 30 has been fully configured for the task at hand using the configuration tool 20, the robot 12 automatically deposits the configuration tool 20 to its workstation, detaches the configuration tool 20 from the wrist 16, picks up the now-configured end-effector assembly 30 by engaging the tool changer assembly 21, removes the end-effector assembly 30 from the configuration stand 75, and commences operations on the work piece 80 or 90. While only two example work pieces 80 and 90 are shown in FIGS. 2A and 2B for illustrative simplicity, those of ordinary skill in the art will appreciate that the possible range of such work pieces may be as large or small as is required for the particular work being performed. In other words, the ability of the robot 12 to reconfigure the end-effector assembly 30 allows for its use across a wide range of possible work pieces.

Figure 3:
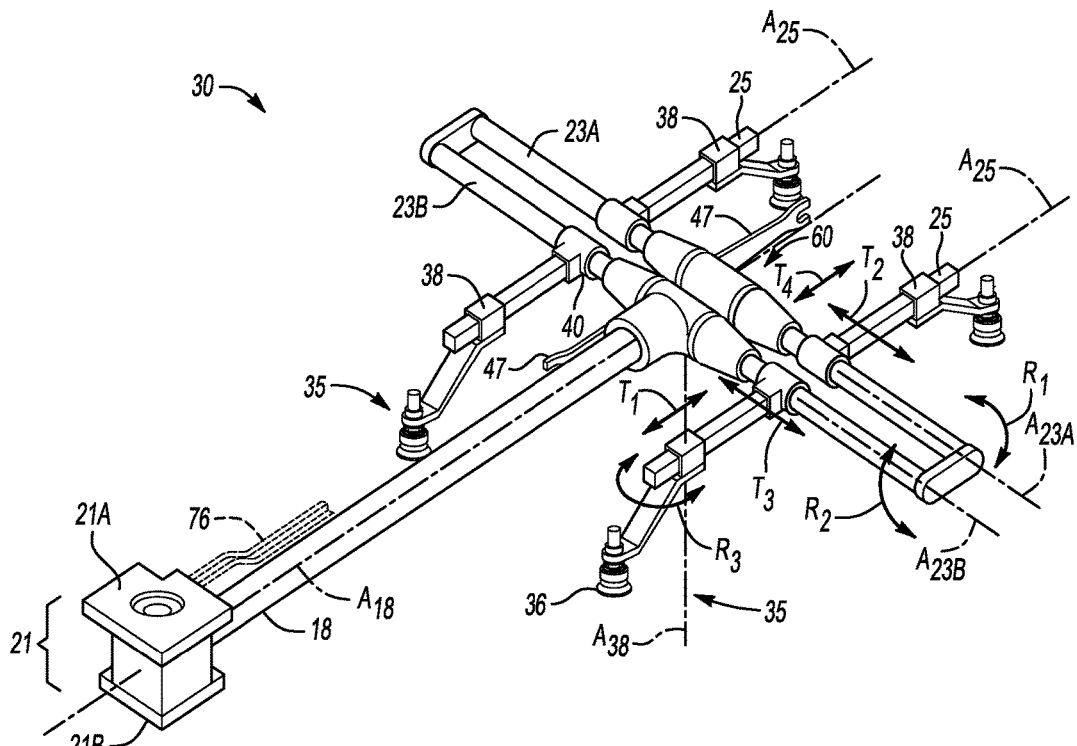
FIG. 3 is a schematic perspective view illustration of the end-effector assembly shown in FIGS. 1-2B.

Referring to FIG. 3, the end-effector assembly 30 includes a pair of frame rails 23A, 23B that are arranged orthogonally with respect to the axis $A_{18}$ of the main boom 18 as noted above, with the various tool modules 35 connected with respect to the radially-extending tool support branches 25. In an example embodiment in which the end tools 36 are pneumatic grippers, pneumatic tubing 76 may be routed along the main boom 18 and directed to the various end tools 36.

When adjusted by the configuration tool 20 shown in FIG. 2 and described in detail below with reference to FIG. 5, the parallel frame rails 23A and 23B may rotate with respect to a corresponding frame rail axis $A_{23A}$ or $A_{23B}$ as indicated by respective arrows $R_1$ and $R_2$. Similarly, the tool modules 35 can rotate with respect to a linear/rotary lock axis $A_{38}$ for a corresponding linear/rotary locking mechanism 38, as indicated by arrow $R_3$. The linear/rotary lock axis $A_{38}$ is orthogonal with respect to the branch axis $A_{25}$ for the particular tool support branch 25 on which the linear/rotary locking mechanism 38 is disposed. Translation of the tool modules 35 along a given branch axis $A_{25}$ is indicated by arrows $T_1$ and $T_4$. Additionally, each tool support branch 25 can translate along one of the frame rails 23A or 23B as indicated by respective arrows $T_2$ and $T_3$. In this manner, any number of different configurations of the tool modules 35 may be set by the robot 12 as needed in response to the commands (arrow 111) from the controller 50.

Figure 4:
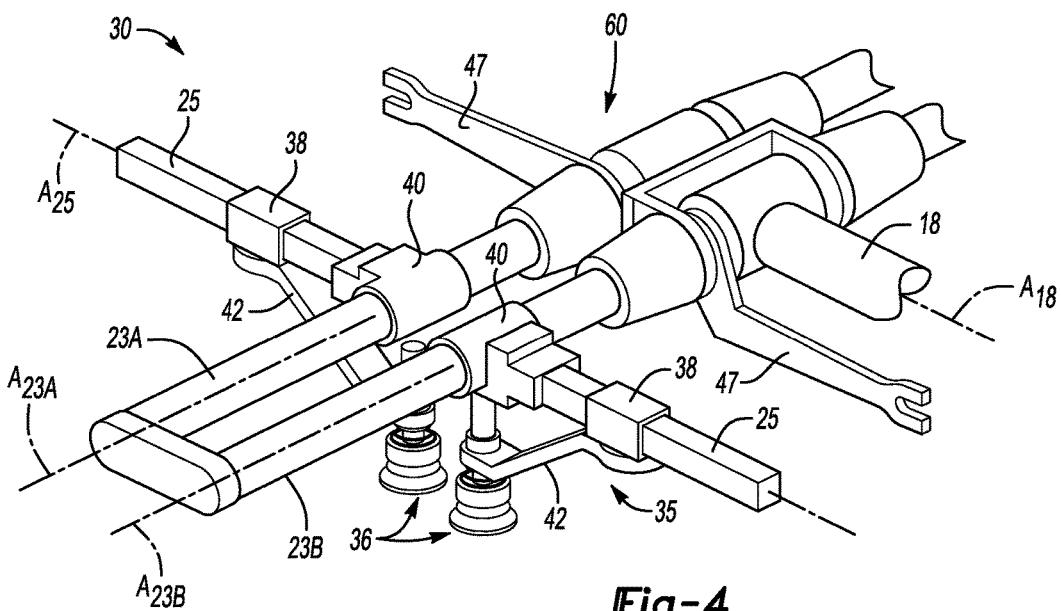
FIG. 4 is a schematic partial-cutaway perspective view illustration of the end-effector assembly shown in FIGS. 1-3.

FIG. 4 is a perspective view of a portion of the end-effector assembly 30 shown in FIG. 3. The frame rails 23A and 23B have respective parallel rail axes $A_{23A}$ and $A_{23B}$. The main boom 18 connects to the frame rails 23A, 23B via the bi-directional clutch assembly 60. Each tool support branch 25 connects to one of the frame rails 23A, 23B via a linear locking mechanism 40. Each tool module 35 connects to a corresponding tool support branch 25 via a linear/rotary locking mechanism 38, which also defines/serves as an air passage as described in further detail below with reference to FIG. 7.

Adjustment of a corresponding lever 47 of the bi-directional clutch assembly 60, such as rotation of a forked lever arm as shown via an adjustment pin 127 of the configuration tool 20 as shown in FIG. 5, repositions one of the unlocked or loosened frame rails 23A or 23B. That is, the frame rails 23A or 23B can be rotated as indicated by arrows $R_1$ and $R_2$ in FIG. 3 using the robot 12 to drive the adjustment pin 127 in a circular arc around a corresponding frame rail axis $A_{23A}$ or $A_{23B}$. In one embodiment, pneumatic pressure to the bi-directional clutch assembly 60 is required to unlock the bi-directional clutch assembly 60 from the parallel frame rails 23A, 23B pneumatically by supplying air pressure to chambers (not shown) on one side of the bi-directional clutch assembly 60. Conversely, the bi-directional clutch assembly 60 can be locked pneumatically by supplying air pressure to the chambers (not shown) on the opposite side of the bi-directional clutch assembly 60. The linear/rotary locking mechanism 38, when sufficiently loosened, allows the tool module 35 that is suspended below it to translate along one of the axes $A_{25}$, as indicated by arrow $T_1$ or $T_4$, and to rotate as well around an axis $A_{38}$ as indicated by arrow $R_3$.

Likewise, adjustment of the linear locking mechanism 40 allows the tool support branches 25 to translate along the frame rail axis $A_{23A}$ or $A_{23B}$ as indicated by arrow $T_2$ and $T_3$. Once again, by programming the controller 50 with all required positions and orientations of the frame rails 23 and tool support branches 25 for a given work piece, the robot 12 of FIG. 1 can be commanded to configure the end-effector assembly 30 for use with a host of different work pieces, doing so via automatic adjustment of the bidirectional clutch assembly 60, the linear/rotary locking mechanism 38, and/or the linear locking mechanism 40 as needed.

FIG. 5 depicts an example embodiment of the configuration tool 20, which was previously described with reference to FIG. 1, with the configuration tool 20 shown as being attached to the wrist 16 of the robot 12. The configuration tool 20 includes an axially-extending tool assembly 22 and a control block 26 disposed at opposite distal ends $E_1$ and $E_2$ of the configuration tool 20, and joined together via axially-extending support rails 24. The tool assembly 22 may include parallel plates 122 each shaped as a rectangle or a polygon, and each mounted and extending from a first end plate 31 toward a second end plate 131. Both end plates 31 and 131 may be rectangular in shape, with the first end plate 31 being larger in area than the second end plate 131 to facilitate use in configuring the end-effector assembly 30. Adjustment pin 127 may be mounted to one of the parallel plates 122 and configured to engage the levers 47 shown in FIG. 4 as noted above.

A nut driver 33, e.g., a torque wrench rotatable about an axis $A_{20}$ of the configuration tool 20, extends from the second end plate 131 and is used to adjust the linear/rotary locking mechanisms 38 and/or the linear locking mechanisms 40 noted above and shown in FIGS. 3 and 4. At distal end $E_2$, the control block 26 may include electrical ports 27 and an additional tool changer 29, i.e., a mechanical coupling allowing the robot 12 to pick up the configuration tool 20, as well as guide pins 28 or other suitable coupling devices which enable the robot 12 to engage the configuration tool 20 with the wrist 16. The electrical ports 27 channel necessary electric power and control signals to run the nut driver 33 via a drive motor 59 of the nut driver 33. Once coupled to the wrist 16, the configuration tool 20 locks into place and electrical and/or pneumatic power is provided to the nut driver 33 as needed to rotate a driver bit 133, e.g., a hex-head bit. A small motor control module 150 may reside on the configuration tool 20 to provide, in conjunction with the controller 50, localized control over operation of the configuration tool 20, such as over torque settings and the like.

Referring to FIG. 6, the operation of the tool assembly 22 is illustrated with respect to adjustment of a tool module 35. As shown, the end tool 36 is bolted to a distal end $E_3$ of an angled swing arm 42, and also may be suspended via a spring and swivel assembly 49 as shown to enable optimal conforming to the different heights and contours of the work pieces, e.g., 80 or 90 of FIGS. 2A and 2B. To adjust the linear/rotary locking mechanism 38, which is attached to or integrally formed with the swing arm 42, the robot 12 of FIG. 1 first aligns locating pins $P_1$ and $P_2$ extending outward from the end plate 131 with mating locating holes 41 in another distal end $E_4$ of the swing arm 42. The locating pins $P_1$ and $P_2$ may be round or bullet-shaped received within locating holes 41 defined by an insert 53 or material of the angled swing arm 42 as best shown in the partial cutaway view of FIG. 7.

Once properly aligned, the nut driver 33 of FIG. 6 may engage a fastener 52 of the linear/rotary locking mechanism 38. By loosening the fastener 52, the linear/rotary locking mechanism 38 is free to translate along the axis of the tool support branch 25, and/or the tool module 35 is free to rotate about one of the linear/rotary lock axes $A_{38}$ of FIG. 3 or, equivalently, the nut driver axis $A_{20}$. The robot 12 can thereafter tighten the linear/rotary locking mechanism 38 into place after moving on to the next adjustment location on the end-effector assembly 30.

Figure 7:
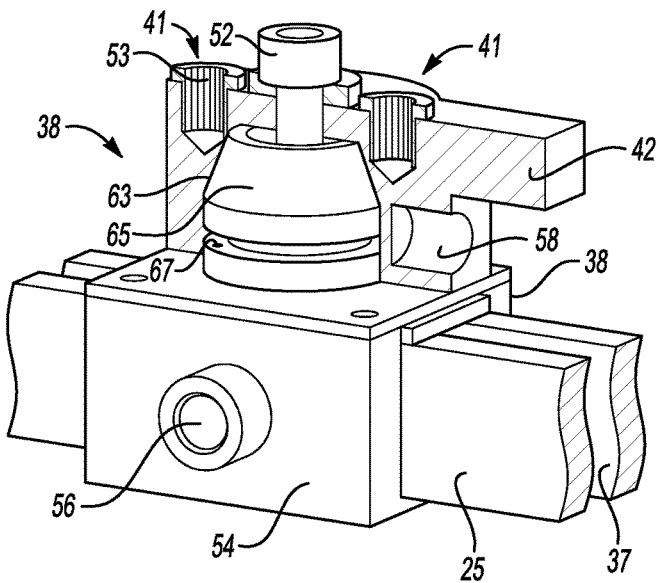
FIG. 7 is a schematic partial-cutaway perspective view illustration of an adjustable linear/rotary locking mechanism for the example tool module shown in FIG. 6.
Figure 8:
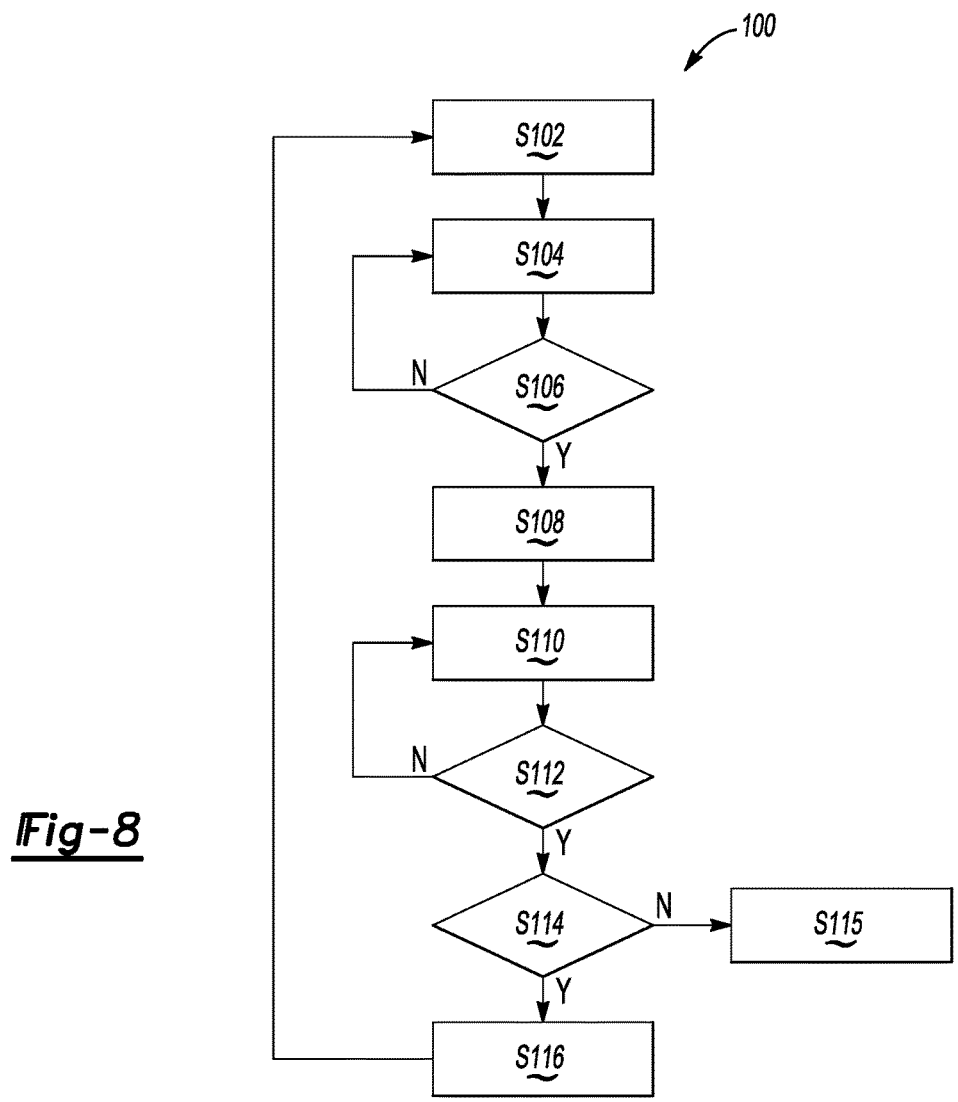
FIG. 8 is a flow chart describing an example method of controlling the robotic system shown in FIG. 1.

FIG. 7 depicts a partial cross-sectional view of a linear/rotary locking mechanism 38 of FIG. 6 and a portion of the angled swing arm 42 connected to the linear/rotary locking mechanism 38. The linear/rotary locking mechanism 38 in an embodiment is not only configured to lock/unlock with respect to a given tool support branch 25, but also serves as a manifold or an air passage for supplying pneumatic power to the end tool 36. Thus, an air inlet 56 is formed in a body 54 of the linear/rotary locking mechanism 38, with the body 54 being a box surrounding the tool support branch 25 on all sides and translating along an axial slot 37 of the tool support branch 25 in the example embodiment shown in FIG. 6. An air outlet 58 is orientated in a direction parallel to the branch axis $A_{25}$. Pneumatic tubing 76 as shown in FIG. 3 of the type used to apply a vacuum or deliver air to the bi-directional clutch assembly 60 or the end tools 36 may be coiled on the frame rails 23 and the tool support branches 25 so as to provide necessary slack as the end tools 36 are repositioned by the robot 12.

In this manner, some of the pneumatic tubing 76 of FIG. 3 can be routed to the linear/rotary locking mechanism 38, conducting air or a vacuum through the body 54 and air outlet 58, and ultimately connecting to the end tool 36. Tightening of the fastener 52 ultimately clamps the linear/rotary locking mechanism 38 to the tool support branch 25 to prevent movement of the body 54 along the branch axis $A_{25}$ and of the swing arm 42 around the linear/rotary lock axis $A_{38}$ while loosening of the fastener 52 frees the linear/rotary locking mechanism 38 to translate along the branch axis $A_{25}$. In an example embodiment, the linear/rotary locking mechanism 38 may include female and male cone carriers 63 and 65 built on or around the body 54, with the female cone carrier 63 being defined by the swing arm 42 as shown. Within this structure an air passage 67 connects the air inlet 56 to the air outlet 58. Any other suitable internal construction needed for providing the specified clamping functionality may be used in the alternative within the intended inventive scope.

Referring to FIG. 8, an example embodiment of the method 100 commences with step S102. In this step, the controller 50 selects a work task to be performed by the robot 12. For instance, the controller 50 may be informed via the input signals (arrow 11) that the robot 12 is required to grip and move the work piece 80 shown in FIG. 2A. The controller 50 may thereafter extract from its memory (M) the required end-effector configuration for executing the required work task. The method 100 proceeds to step S104 once the controller 50 is aware of the task to be performed and the configuration is loaded in memory (M).

At step S104, the controller 50 instructs the robot 12 to pick up the configuration tool 20, doing so via transmission of the control signals (arrow 111) of FIG. 1. The robot 12, in response to the robot control signals (arrow 111), moves its wrist 16 into engagement with block 26 of FIG. 5 and adjusts the end-effector assembly 30 at the configuration station 75 shown in FIG. 1. The method 100 proceeds to step S106 as this process is ongoing.

Step S106 includes determining whether the end-effector assembly 30 has been fully configured for the present work task. The method 100 proceeds to step S108 when all of the frame rails 23 and tool support branches 25 have been adjusted, and when all of the tool modules 35 are positioned as required and securely locked into place.

At step S108, the robot 12, having previously determined at step S106 that the configuration is complete, deposits the configuration tool 20 at a suitable work station. While omitted from the Figures for illustrative simplicity, such a work station may be embodied as a fixture which allows the configuration tool 20 to be retained at a calibrated position, i.e., a position readily accessible by the wrist 16. The robot 12 then picks up the now-adjusted end-effector 30 from the configuration station 75. Step S108 may entail aligning the tool changer 21A with mating structure (not shown) of the wrist 16 and locking the tool changer 21A into place, e.g., via quick connect fittings or the like. The method 100 then proceeds to step S110.

Step S110 includes performing the assigned work task, such as picking up the work piece 80 of FIG. 2A using suction and depositing the work piece in a target location, such as a vehicle body or staging area. The method 100 proceeds to step S112 after operation on the work piece is complete.

Step S112 includes determining whether operation on all similar work pieces for the present work task is complete. For instance, if a batch of a predetermined number of work pieces is to be lifted and deposited on an assembly line, the controller 50 may determine at step S112 whether work on all of the predetermined number of work pieces has been completed. The method 100 proceeds to step S114 when the batch is complete.

At step S114, the controller 50 determines if another work task is to be performed by the robot 12, e.g., a task involving the lifting and placement of the alternative work piece 90 of FIG. 2B. If so, the method 100 proceeds to step S116. Otherwise, the method 100 proceeds to step S115.

Step S115, which is reached when the present work task is complete and there are no remaining work tasks for the robot 12 to complete, includes loading the end-effector assembly 30 onto the configuration station 75 of FIG. 1 and commanding the robot 12 to a execute a standby or off state, whereupon the robot 12 awaits further instructions. The method 100 thereafter resumes at step S102.

At step S116, the robot 12 next loads the end-effector assembly 30 onto the configuration stand 75 of FIG. 1, secures the configuration tool 20 to a fixture (not shown), and proceeds to step S102. The method 100 thereafter proceeds as described above with reference to steps S102-S114.

Referring to FIG. 9, the end-effector assembly 30 is shown in two positions: a load position (I) and a configuration position (II). Only one of the two positions is possible at a given time, as will be described in detail below with reference to FIGS. 10A-C, and therefore the configuration position (II) is shown in phantom.

In a possible embodiment, the configuration stand 75 noted above with reference to FIG. 1 may be a single-axis rotary stand, and thus may include a stand motor 66 having an axis of rotation $A_{66}$. The stand motor 66 may be any electrical motor or other rotary actuator operable for flipping the end-effector assembly 30, 180 degrees about the axis $A_{66}$, from the load position (I) to the configure position (II) and back again. While in the load position (I), the end-effector assembly 30 is positioned such that the axis $A_{18}$ of the main boom 18 is horizontal with respect to the floor 85 as shown in FIG. 10A and arranged 45 degrees to the axis $A_{66}$. The tool changer assembly 21, not visible in the view of FIG. 9, engages a mating tool changer 221 located on the axis $A_{66}$ adjacent to the stand motor 66.

Successful docking of the tool changer assembly 21 with the tool changer 221 may be automatically detected, such as via a switch sensor (not shown) as is known in the art, and communicated to the controller 50. The controller 50 may thereafter command the robot 12 to retrieve the configuration tool 20 of FIG. 5 from a work station or fixture (not shown). While the robot 12 retrieves the configuration tool 20, the stand motor 66 automatically rotates about axis $A_{66}$ in the direction of arrow $X_1$. This rotation causes the end-effector assembly 30 to flip 180 degrees with respect to the 45 degree diagonal axis $A_{66}$ such that the end-effector assembly 30 becomes vertically-oriented within the configuration stand 75 as shown in FIG. 10C, thereby achieving the configuration position (II) of FIG. 9. Rotation in the reverse direction is indicated via arrow $X_2$. In the configuration position (II), the robot 12 of FIG. 1 is able to commence reconfiguring of the end-effector assembly 30 using the configuration tool 20.

As part of the present design, a torque/force sensor $S_F$ may be positioned on the stand motor 66, e.g., sandwiched between the tool changer 221 and the stand motor 66. Such a torque/force sensor $S_F$ can detect potentially overloading torques/forces (arrow $F_O$) during the configuration phase and communicate the detected values to the controller 50, with torques/forces in excess of a threshold force used by the controller 50 to halt the process or take other corrective actions. A benefit of such a design feature is that a small drag force between the configuration tool 20 and linear locking mechanism 40 or linear/rotary locking mechanism 38 will be amplified to a more readable load on the torque/force sensor $S_F$ to protect the end-effector assembly 30, the configuration stand 75, and the robot 12 from excessive stress or strain.

Figure 10B:
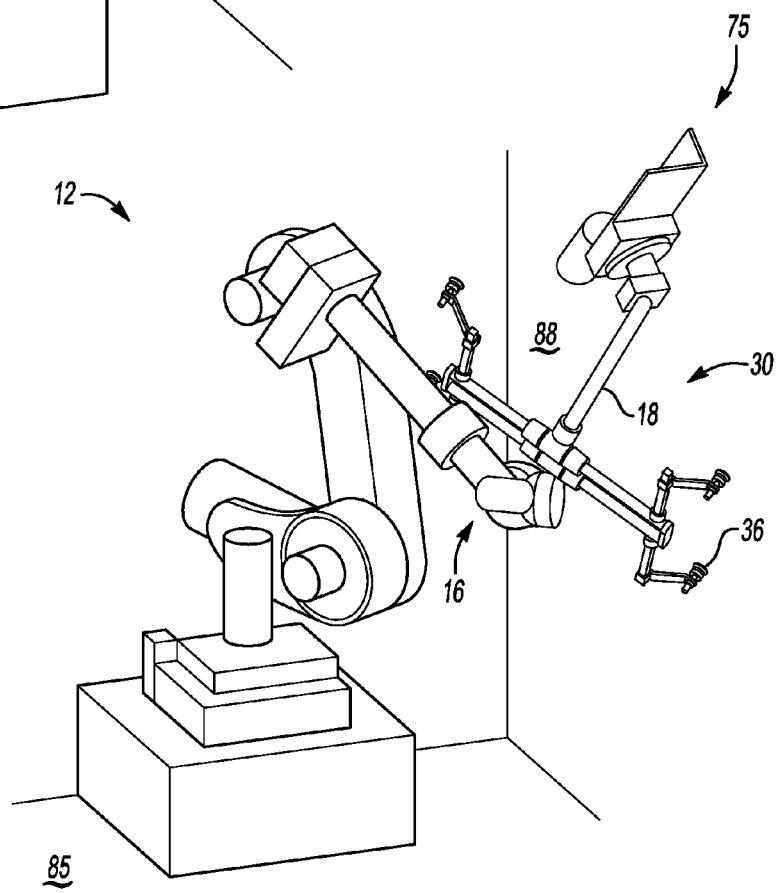
Figure 10C:
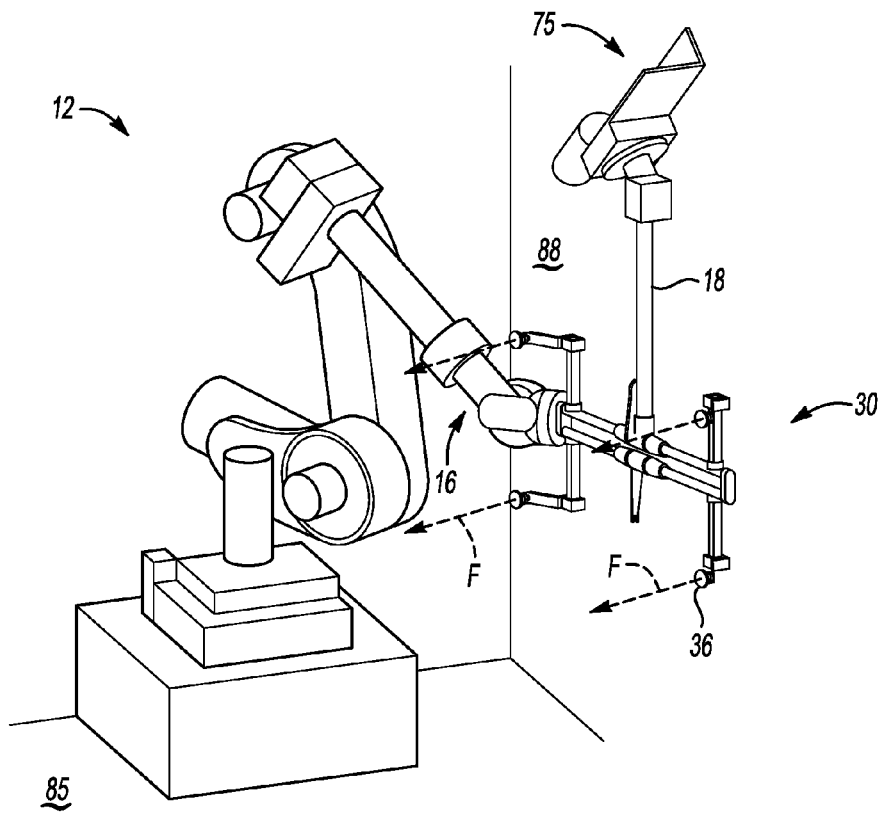

FIGS. 10A-C collectively depict the progression of the end-effector assembly 30 as it is flipped from the load position as shown in FIG. 10A, through an intermediate position (FIG. 10B), and ultimately to the configuration position (FIG. 10C). The configuration stand 75 in the example embodiment of FIGS. 9-10C may be vertically-oriented with respect to a machine column 88 or other vertical surface.

In FIG. 10A, the end-effector assembly 30 is oriented such that the axis $A_{18}$ of the main boom 18 is horizontal with respect to a plane of the floor 85, which is also indicated as the load position I in FIG. 9. In the load position of FIG. 10A, the end tools 36 are facing away from the robot 12 as indicated by arrows R, thus representing a rearward-facing orientation with respect to the robot 12. In FIG. 10B, the end-effector assembly 30 has moved about halfway through its range of motion around axis $A_{66}$, with the rotation beginning to expose the tool modules 35 to the robot 12. FIG. 10C depicts the configuration position, i.e., position II of FIG. 9. Once the configuration position of FIG. 10C is achieved, the tools 36 are exposed to the robot 12 as indicated by arrows F, representing a forward-facing orientation with respect to the robot 12. The robot 12 can thereafter use the configuration tool 20 to adjust the end-effector assembly 30 as needed depending on the work task to be performed. Thus, the overall sequence allows for locking and flipping of the end-effector assembly 30 between the loading and configuration positions in space-efficient manner.

Multi-axis designs may exist as alternatives to the single-axis motor 66 design shown in FIGS. 9 and 10A-C. For instance, a two-stage approach may be used. At the start of the process, a first actuator can tilt and lift the end-effector assembly 30 through a range of 180 degrees of flipping along tilting axis, e.g., 30 degrees with respect to the vertical. Thereafter, the end-effector assembly 30 can be tilted rearward such that the end-effector assembly 30 remains vertically secured with the various tool modules 35 facing the robot 12. After the configuration phase, the end-effector assembly 30 may be tilted, flipped, and tilted again such that the tool modules 35 again face a machine column 88. These and other embodiments may be contemplated within the present inventive scope.

Figure 11A:
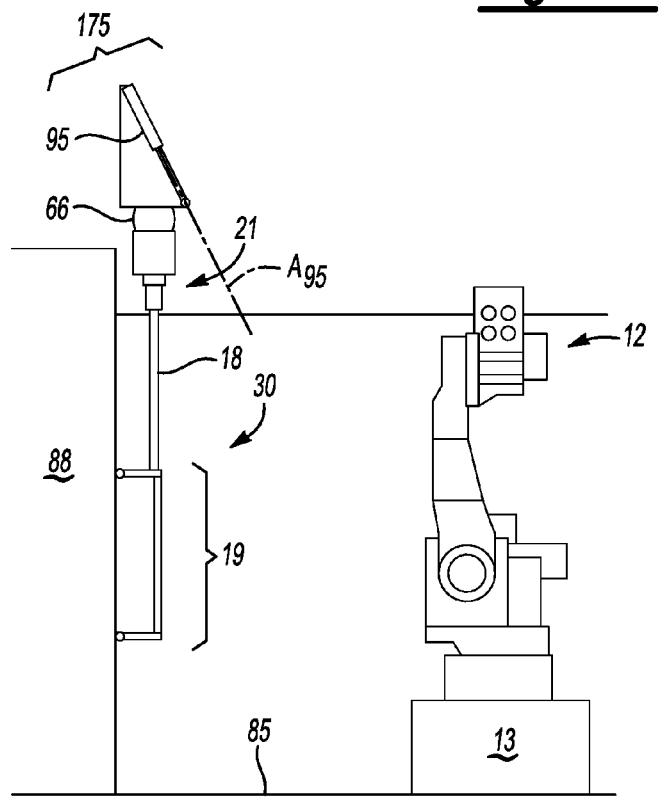
FIGS. 11A-E are schematic side view illustrations of an alternative configuration stand having a dual-axis sequence.
Figure 11B:
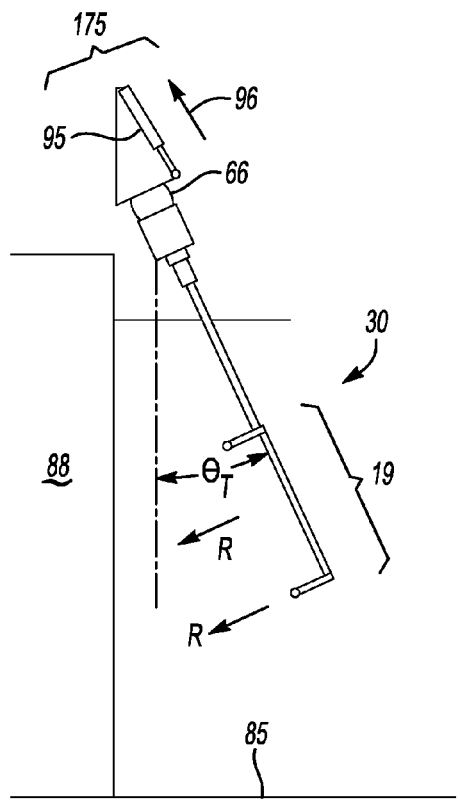

FIGS. 11A-E collectively depict an alternative configuration stand 175 providing an alternative dual-axis configuration sequence. In this embodiment, the configuration stand 175 includes a linear actuator 95, e.g., a cylinder and piston, ball screw, or other suitable linear actuator having a longitudinal axis $A_{95}$. FIG. 11A shows the end-effector assembly 30 in a load configuration hanging vertically with respect to the machine column 88 after engagement of the tool changer assembly 21 with the tool changer 221 (see FIG. 9) of the configuration stand 175.

Figure 11C:
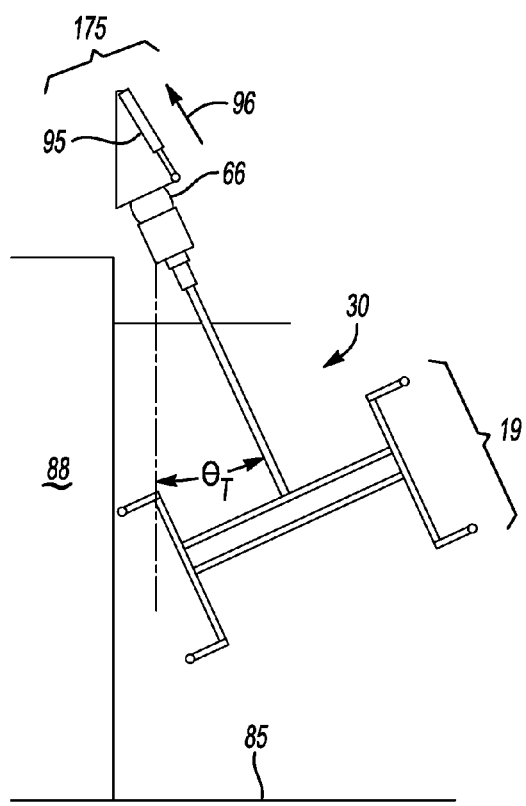

Once the end-effector assembly 30 is successfully docked, the actuator 95 tilts the end-effector assembly 30 through a calibrated tilt angle ($\theta_T$) as shown in FIG. 10B, such as by retracting a piston arm in the direction of arrow 96 to cause tilting a corresponding of the main boom 18. The calibrated tilt angle ($\theta_T$) may be in the example range of about 25-35 degrees, or 30 degrees in another embodiment, with the actual range depending on available space. The end tools 36 remain oriented away from the robot 12 (not shown) as indicated by arrows R. Once the axis of the main boom 18 has been tilted to the calibrated tilt axis ($\theta_T$) as shown in FIG. 11C, the motor 66 rotates the end-effector assembly 30 as explained above with reference to FIGS. 9-10C.

Figure 11D:
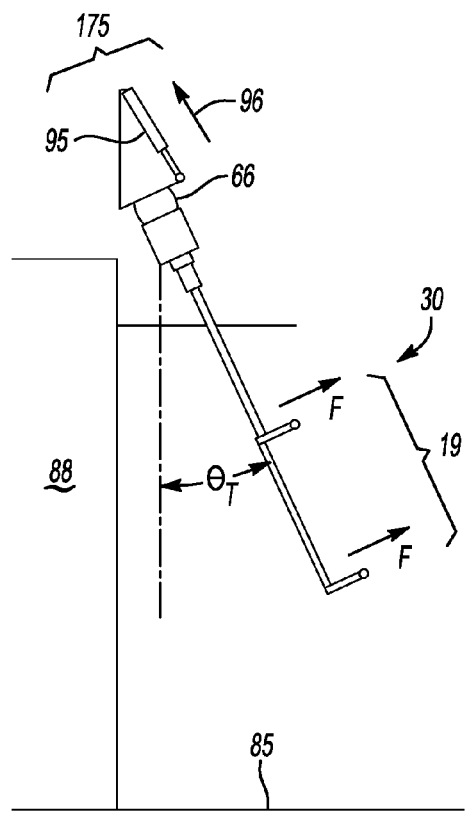
Figure 11E:
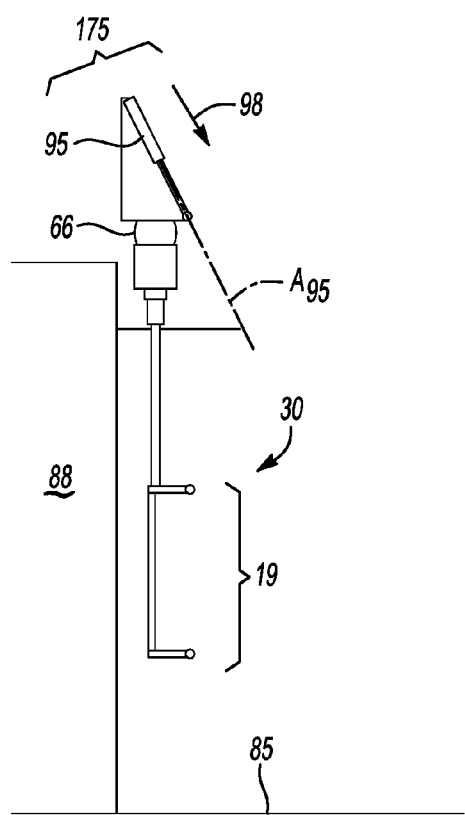

FIG. 11D depicts the end-effector assembly 30 once the end-effector assembly 30 has flipped 180 degrees, such that the end tools 36 now face the robot 12 as indicated by arrows F. At this point, as shown in FIG. 11E, the linear actuator 95 extends in the direction of arrow 98 to return the end-effector assembly 30 to a vertical orientation as shown. Thus, FIG. 11E depicts the configuration position noted above, while FIG. 11A depicts the load position. Unlike the single-axis design in which the main boom 18 is horizontally oriented in the load position, the dual-axis design of FIGS. 11A-E requires vertical orientation of the main boom 18 in both load and configuration positions.

Figure 12:
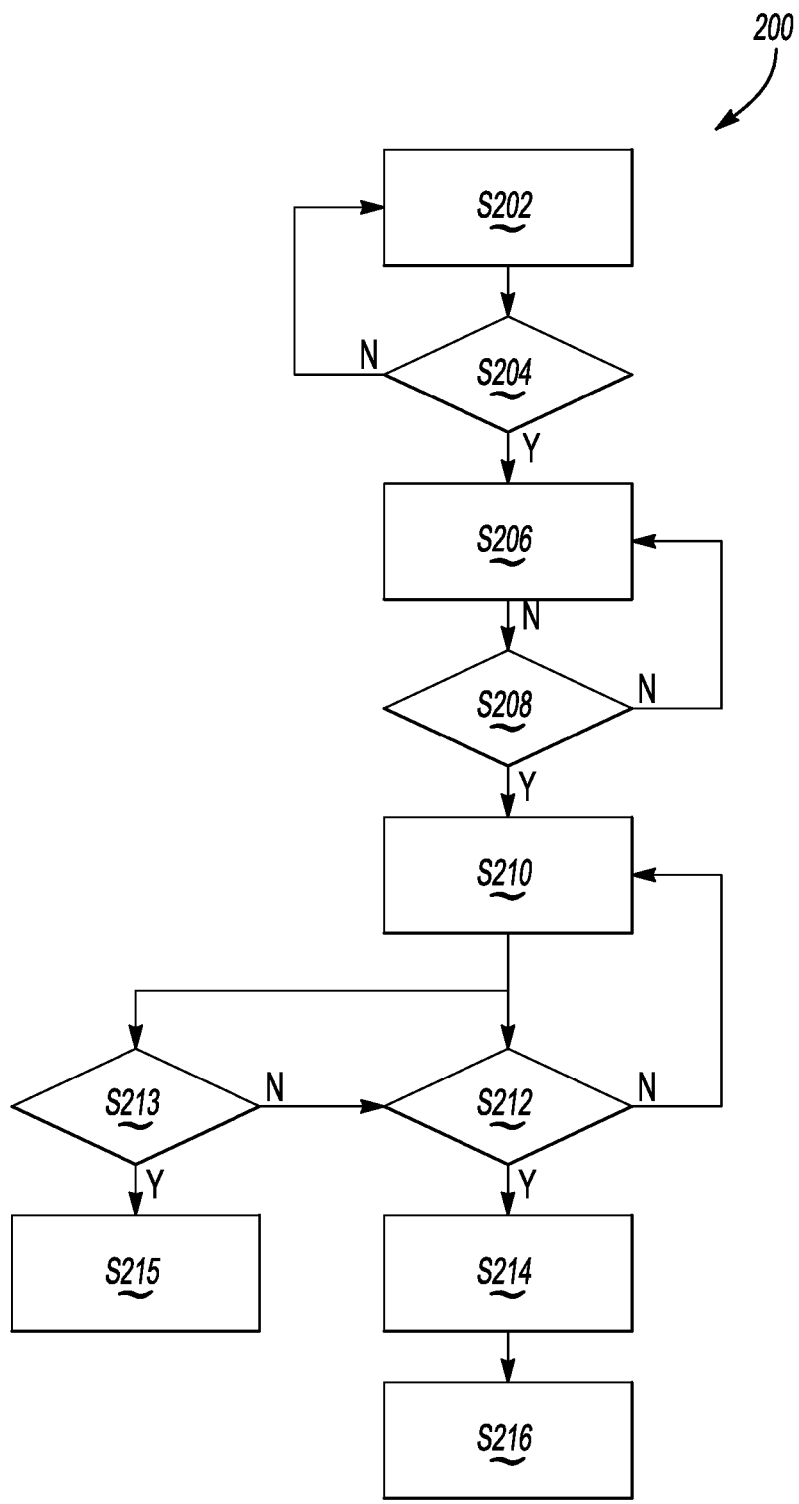
FIG. 12 is a flow chart describing an example method of using the configuration stand shown in FIGS. 9-10C.

Referring to FIG. 12, an example method 200 of operating the configuration stand 75 of FIGS. 9-10C or the alternative configuration stand 175 of FIGS. 11A-E commences at step S202, wherein the end-effector assembly 30 is positioned on the configuration stand 75, 175 in the load position. Step S202 may include engaging the tool changer assembly 21 at the end of the master boom 18 with the tool changer 221 located on the configuration stand 75, with general tool changer structure and engagement techniques being known in the art. The method 200 then proceeds to step S204.

At step S204, the controller 50 of FIG. 1 determines whether the end-effector assembly 30 is securely in place on the configuration stand 75 or 175, e.g., using a switch sensor or other suitable means. Steps S202 and S204 are repeated until the end-effector assembly 30 has been verified by the controller 50 as being securely locked into place in the load position, e.g., position I of FIG. 9 or the position shown in FIG. 11A. The method 200 thereafter proceeds to step S206.

Step S206 entails disengaging the robot wrist 16 from the end-effector assembly 30, commanding the robot 12 to pick up the configuration tool 20 from a suitable workstation (not shown), as well as flipping or tilting and flipping the now-captive end-effector assembly 30 from the load position toward the configuration position using either of the single-axis or dual-axis approaches described above.

Step S208 entails determining whether the configuration tool 20 has been attached to the robot wrist 16 and the end-effector assembly 30 has attained the configuration position of FIG. 10C or 11E. If not, the method 200 repeats step S206 as set forth above. The method 200 proceeds to step S210 when the configuration position has been attained.

At step S210, the controller 50 next commands the robot 12 to configure the end-effector assembly 30 using the configuration tool 20 shown schematically in FIG. 5. The method 200 thereafter proceeds simultaneously to steps S212 and S213.

Step S212 entails determining whether the configuration phase of control is complete. Steps S210 and S212 continue in a loop until the end-effector assembly 30 has been properly configured, and thereafter proceeds to step S214.

Step S213 entails using the torque/force sensor $S_F$ to measure the torques/forces between the configuration tool 20 and/or other structure of the configuration stand 75, 175 and the tool changer 221, and comparing the measured torques/forces to a calibrated threshold torque or force. Use of the torque/force sensor $S_F$ in the configuration position enables the controller 50 to determine if any of the reconfigurable components has excess drag or are otherwise not moving freely. If so, the robot 12 could damage the end-effector assembly 30, and thus control actions are taken by the controller 50 to prevent this from occurring. By placing the torque/force sensor $S_F$ at the tool changer 21 at the top of the end-effector assembly 30, even a small drag force will be amplified to a more readable load on the sensor $S_F$. Higher resolution will help provide fewer false readings. The method 200 proceeds to step S212 when the threshold torque or force is not exceeded, and to step S215 in the alternative when the threshold torque or force is exceeded.

At step S214, the robot 12 of FIG. 1 next detaches and deposits the configuration tool 20 to a suitable work station (not shown). As this occurs, the stand motor 66 rotates the now-configured end-effector assembly 30 back to the load position of FIG. 10A, effectively reversing the operation described with reference to steps S202-S214. The method 200 proceeds to step S216.

Step S215 includes executing a control action in response to the threshold force detected at step S213. Possible example control actions include stopping the configuration motion of the robot 12 or reversing the configuration motion to a default/fail-safe position suitable for re-zeroing or maintenance.

At step S216, the robot 12 picks up the end-effector assembly 30 and commences work on the work piece using the now-configured end-effector assembly 30. The method 200 returns to step S202 when the work task is complete.

Thus, the method 200 allows the robot 12 at the end of a material handling operation to load the end-effector assembly 30 onto the configuration stand 75 or 175, lock and flip the end-effector assembly 30 to a reconfigurable position, pick up a configuration tool 20 from a tool stand or fixture, and start to configure the end-effector assembly 30. At the end of configuration phase the configuration stand 75 or 175 flips and releases the end-effector assembly 30 back to the load position. The robot 12 can then pick up the end-effector assembly 30 from the configuration stand 75 or 175 and resume the material handling or other operation.

The detailed description and the drawings or figures are supportive and descriptive of the disclosure, but the scope of the disclosure is defined solely by the claims. While the best mode, if known, and other embodiments for carrying out the disclosure have been described in detail, various alternative designs and embodiments exist for practicing the disclosure as defined in the appended claims.

The invention claimed is:

1. A robotic system comprising:
a multi-axis robot having an arm and a wrist;
an end-effector assembly having a main boom, a tool changer assembly disposed at a distal end of the main boom, parallel frame rails arranged orthogonally with respect to the main boom and rotatable with respect to an axis of the main boom, a plurality of tool support branches arranged orthogonally with respect to the parallel frame rails, and a plurality of tool modules connected to a respective one of the tool support branches, wherein the tool modules are rotatable and translatable with respect to an axis of a respective one of the branches;
a configuration tool having a control block disposed at one distal end of the configuration tool that is selectively engageable via the tool changer assembly, and a work tool disposed at another distal end of the configuration tool; and
a controller programmed to command the robot to automatically configure the end-effector assembly by adjusting at least one of the tool modules, the parallel rails, and the tool support branches using the configuration tool in response to an identified work task, and to thereafter command engagement of the wrist with the tool changer and execute the identified work task using the configured end-effector assembly.

2. The robotic system of claim 1, wherein the tool modules are pneumatic suction cups or grippers.

3. The robotic system of claim 2, wherein the end-effector assembly includes a plurality of linear/rotary locking mechanisms that connect the tool modules to a respective one of the branches.

4. The robotic system of claim 3, wherein each of the plurality of linear/rotary locking mechanisms defines an air passage configured for applying a vacuum to the suction cups or grippers.

5. The robotic system of claim 1, further comprising a bi-directional clutch assembly configured to lock or release the parallel frame rails with respect to the main boom.

6. The robotic system of claim 1, further comprising a configuration stand, wherein the tool changer assembly includes a first tool changer configured to engage the robot and a second tool changer configured to simultaneously engage the configuration stand.

7. The robotic system of claim 6, wherein the configuration stand includes a motor with a rotor axis, and wherein the controller is programmed to command the robot to automatically engage the tool changer assembly of the end-effector assembly with the second tool changer of the configuration stand to thereby achieve a load position of the configuration stand, automatically flip the end-effector assembly 180 degrees with respect to the rotor axis to a configuration location of the configuration stand, command engagement of the wrist with the configuration tool, and configure the end-effector assembly to execute the identified work task using the configuration tool.

8. The robotic system of claim 7, wherein the controller is further programmed to automatically detect when the configuration of the end-effector assembly is complete, and to thereafter flip the end-effector assembly 180 degrees with respect to the rotor axis back to the load location.

9. The robotic system of claim 6, wherein the configuration stand further includes a linear actuator operable for tilting the end-effector assembly to a calibrated tilt angle before rotating the end-effector assembly via the motor.

10. The robotic system of claim 1, further comprising a plurality of angled swing arms connecting the linear/rotating locking mechanism to the tool modules, wherein the configuration tool has a pair of locating pins and the angled swing arms each have a pair of mating locating holes configured to receive the locating pins.

11. A robotic system comprising:
a multi-axis robot having an arm and a wrist;
an end-effector assembly having a main boom, a tool changer assembly disposed at a distal end of the main boom, parallel frame rails arranged orthogonally with respect to the main boom and rotatable with respect to an axis of the main boom, a plurality of tool support branches arranged orthogonally with respect to the parallel frame rails, and a plurality of tool modules connected to a respective one of the tool support branches, wherein the tool modules are rotatable and translatable with respect to an axis of a respective one of the branches, wherein the end-effector assembly includes a plurality of linear/rotary locking mechanisms that connect the tool modules to a respective one of the branches;
a configuration tool having a control block disposed at one distal end of the configuration tool that is selectively engageable via the wrist, and a work tool disposed at another distal end of the configuration tool;
a configuration stand providing a known reference frame for configuration of the end-effector assembly, wherein the tool changer assembly includes a first tool changer configured to engage the robot and a second tool changer configured to simultaneously engage the configuration stand; and
a controller programmed to command the robot to automatically configure the end-effector assembly by adjusting at least one of the tool modules, the parallel rails, and the tool support branches using the configuration tool in response to an identified work task, and to thereafter command engagement of the wrist with the tool changer and execute the identified work task using the configured end-effector assembly.

12. The robotic system of claim 11, wherein the tool modules are pneumatic suction cups or grippers.

13. The robotic system of claim 11, wherein each of the plurality of linear/rotary locking mechanisms defines an air passage configured for applying a vacuum to the suction cups or grippers.

14. The robotic system of claim 11, further comprising a bi-directional clutch assembly configured to lock or release the parallel frame rails with respect to the main boom.

15. The robotic system of claim 11, wherein the configuration stand includes a motor with a rotor axis, and wherein the motor is operable for flipping the end-effector assembly with respect to the rotor axis.

16. The robotic system of claim 15, wherein the controller is programmed to command the robot to automatically engage the tool changer assembly of the end-effector assembly with the second tool changer of the configuration stand to thereby achieve a load position of the configuration stand, automatically flip the end-effector assembly 180 degrees with respect to the rotor axis to a configuration location of the configuration stand, command engagement of the wrist with the configuration tool, and configure the end-effector assembly to execute the identified work task using the configuration tool.

17. The robotic system of claim 16, wherein the controller is further programmed to automatically detect when the configuration of the end-effector assembly is complete, and to thereafter flip the end-effector assembly 180 degrees with respect to the rotor axis back to the load location.

18. The robotic system of claim 16, wherein the configuration stand further includes a linear actuator operable for tilting the end-effector assembly to a calibrated tilt angle before rotating the end-effector assembly via the motor.

19. The robotic system of claim 11, further comprising a plurality of angled swing arms connecting the linear/rotating locking mechanism to the tool modules, wherein the configuration tool has a pair of locating pins and the angled swing arms each have a pair of mating locating holes configured to receive the locating pins.

* * * * *